(12) United States Patent
Chiu et al.

(10) Patent No.: US 11,106,112 B1
(45) Date of Patent: Aug. 31, 2021

(54) DIAPHRAGM SHEET TRANSFER DEVICE

(71) Applicant: Intelligent Mechatronics Industry Co., Ltd., Taoyuan (TW)

(72) Inventors: Chi-Wei Chiu, Taoyuan (TW); Yung-Yun Chen, Taoyuan (TW)

(73) Assignee: Intelligent Mechatronics Industry Co., Ltd., Taoyuan (TW)

( * ) Notice: Subject to any disclaimer, the term of this patent is extended or adjusted under 35 U.S.C. 154(b) by 0 days.

(21) Appl. No.: 17/004,833

(22) Filed: Aug. 27, 2020

(51) Int. Cl.
*G03B 9/06* (2021.01)

(52) U.S. Cl.
CPC ..................................... *G03B 9/06* (2013.01)

(58) Field of Classification Search
CPC .................................. G03B 9/06; G03B 9/14
USPC ......................................................... 396/510
See application file for complete search history.

(56) References Cited

U.S. PATENT DOCUMENTS

| | | | | |
|---|---|---|---|---|
| 5,459,544 | A | * 10/1995 | Emura | ..................... G03B 9/00 |
| | | | | 396/257 |
| 2019/0137844 | A1* | 5/2019 | Park | ......................... G03B 9/06 |
| 2019/0227199 | A1* | 7/2019 | Kao | ......................... G02B 3/12 |
| 2020/0026149 | A1* | 1/2020 | Jun | ......................... G03B 9/06 |
| 2020/0264495 | A1* | 8/2020 | Zhuo | ......................... G03B 9/06 |
| 2020/0301246 | A1* | 9/2020 | Seo | ...................... H04N 5/2252 |
| 2020/0401014 | A1* | 12/2020 | Seo | ......................... G03B 30/00 |
| 2020/0409235 | A1* | 12/2020 | Zhou | ......................... G03B 9/06 |

* cited by examiner

*Primary Examiner* — Christopher E Mahoney
(74) *Attorney, Agent, or Firm* — Lin & Associates IP, Inc.

(57) ABSTRACT

Provided is a diaphragm sheet transfer device, which is used for a handheld electronic device. Diaphragm sheets include different sizes of a plurality of light through holes. By controlling the positions of the diaphragm sheets, the light through holes with different sizes respectively pass through the incident light paths so that the amount of the light incident to the lens device is changed.

9 Claims, 11 Drawing Sheets

DIAPHRAGM SHEET TRANSFER DEVICE

BACKGROUND OF THE INVENTION

1. Field of the Invention

The present invention relates generally to a diaphragm sheet transfer device, which is specifically used for a handheld electronic device having a camera or recording lens.

2. The Prior Arts

Since the advent of smart phones, because smart phones have camera recording capabilities, the public often use the mobile phones instead of cameras to take pictures. The smart phones are continually innovated in the market, and especially the major mobile phone manufacturers adopt the highest pixel, and large diaphragm. However, the diaphragm of the mobile phone is a fixed diaphragm, and it cannot be zoomed in or zoomed out as a normal camera lens.

The zoomed-in or zoomed-out of controlling the diaphragm is to drive the movement of a plurality of diaphragm sheets through a diaphragm motor. However, since the volume of the mobile phone is required to be thin and lightweight, it is not obviously suitable for the diaphragm motor to be configured in the mobile phone. In addition, the relevant optical structures and components are also disposed in the mobile phone, and even the diaphragm motor not only requires a certain amount of power, but also it should be considered how to dissipate the heat generated by the diaphragm motor and the components. These factors are summed up to the fact that it is necessary to increase a space for internal storage and heat dissipation of the mobile phone, so as to solve the foregoing issue. However, this is contrary to the design of the thin and lightweight requirement of smart phones. Therefore, all smart phones adopt the fixed diaphragm to make the lens structure simpler and save the space provided for other component configurations.

In addition to the large space occupied by the diaphragm motor and the relatively large power consumption required, another limiting factor is the diaphragm structure of the lens. For example, in the iris mode diaphragm, the iris mode diaphragm is used for adjusting the diaphragm size through the diaphragm sheets. When a shutter is pressed in use, the diaphragm is automatically zoomed to a size set by the user on an interface of the camera. In structure, the blades of the diaphragm are stacked one after another. Although the curved thin metal blades are thin, they still have a thickness, together with a combination of the lens itself, the lens may protrude through the mobile phone. Since the lens is easily scratched, the adjustment of the diaphragm cannot be implemented in the smart phone.

SUMMARY OF THE INVENTION

A primary objective of the present invention is to provide a diaphragm sheet transfer device, which is used for a handheld electronic device having a camera or recording lens. The diaphragm sheet includes two light through holes with different opening areas. By changing the positions of the diaphragm sheet, the two light through holes can be respectively transferred to the incident light path, thereby changing the amount of the light incident to the lens.

In one embodiment, a single movable diaphragm sheet is provided, which is disposed on an incident light path of an incident light. The movable diaphragm sheet has two light through holes with different opening areas. The movable diaphragm sheet can be driven to transfer from an initial position to a transfer position. When the movable diaphragm sheet is located at the initial position, only one of the two light through holes corresponds to the incident light path of the incident light for determining the amount of the light incident to the lens device. When the movable diaphragm sheet is located at the transfer position, only another of the two light through holes corresponds to the incident light path of the incident light for determining the amount of the light incident to the lens device.

In one embodiment, the two light through holes are independent of each other and are not staggered with each other.

In one embodiment, at least two movable diaphragm sheets are disposed on an incident light path of an incident light, and the at least two movable two diaphragm sheets respectively have a hollow portion through which the incident light passes, and the at least two movable diaphragm sheets are driven to transfer from an initial position to a transfer position, wherein when the at least two movable diaphragm sheets are driven, each of which rotates by a certain amplitude toward a predetermined direction to change the corresponding extent of the hollow portions between the at least two movable diaphragm sheets.

In one embodiment, the hollow portion includes two light through holes with different opening areas, and the two light through holes are partially intersected, and the hollow portions of the two movable diaphragm sheets at the initial position are complementary as an original shape of the light through hole, and the hollow portions of the two movable diaphragm sheets at the transfer position are complementary as an original shape of another light through hole.

DETAILED DESCRIPTION OF THE PREFERRED EMBODIMENT

The embodiments of the present invention will be described in more detail below with reference to the drawings and the component symbols, so that those skilled in the art can implement the present specification after studying the present specification.

An axial direction referred to hereinafter refers to a direction along a light axis L, a radial direction refers to the direction perpendicular or substantially perpendicular to the light axis, and the light axis refers to a light axis of the lens, that is, an incident direction of an incident light.

Figure 1:
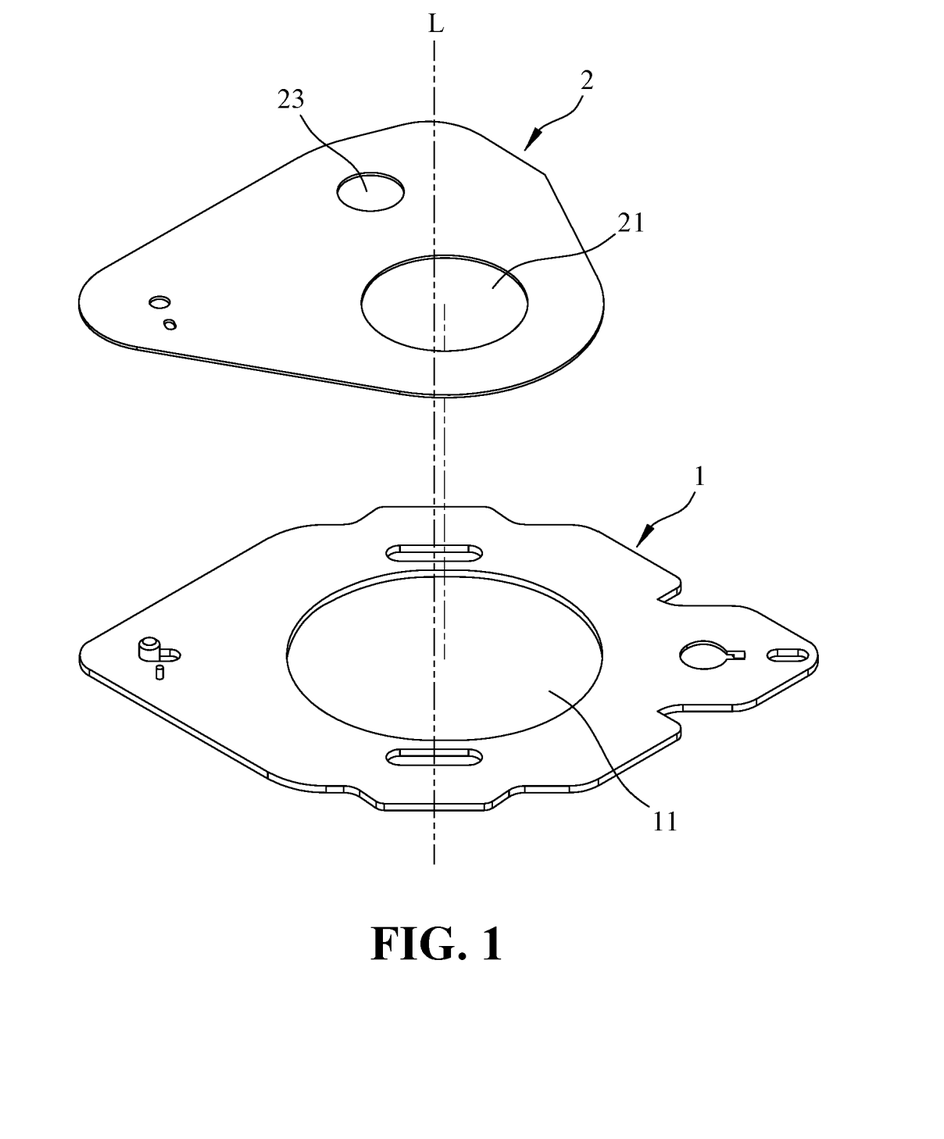
FIG. 1 is an exploded view of a single movable diaphragm sheet and a movable plate according to an embodiment.

Referring to FIG. 1, FIG. 1 is an exploded view of a single movable diaphragm sheet and a movable plate according to an embodiment. As shown in FIG. 1, a diaphragm sheet transfer device includes a movable plate 1 and a movable diaphragm sheet 2 substantially disposed along an incident light path of an incident light. The movable plate 1 moves along the radial direction, and the radial movement of the movable plate 1 has a certain distance. For example, the movable plate 1 is transferred from an initial position to a transfer position, while the movable diaphragm sheet 2 is driven by the movable plate 1 to rotate with respect to the movable plate 1.

The movable plate 1 has a first opening 11 through which the incident light passes, and the movable diaphragm sheet 2 has two light through holes 21 and 23 having different opening areas. The two light through holes in the first embodiment are independent of each other and are not staggered with each other.

When the movable plate 1 is at an initial position, only the large (small) light through hole 21 of the movable diaphragm sheet 2 corresponds to the first opening hole 11, and when the movable plate 1 is at a transfer position, only the small (large) light through hole 23 of the movable diaphragm sheet 2 corresponds to the first opening 11.

The specific connection relationship and action relationship between the movable plate 1 and the movable diaphragm sheet 2 are further explained in the following embodiments.

Figure 2:
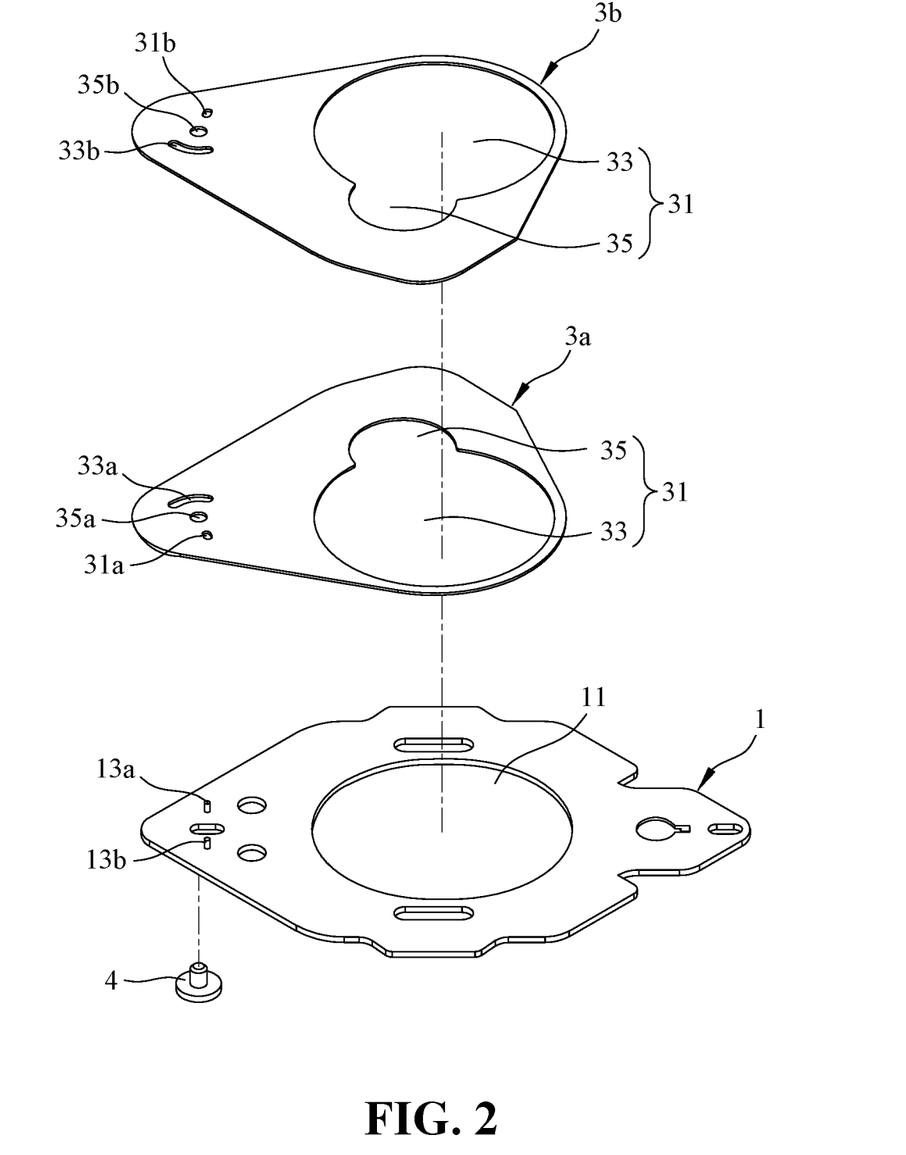
FIG. 2 is an exploded view of two movable diaphragm sheets and a movable plate according to an embodiment.

Referring to FIG. 2, FIG. 2 is an exploded view of two movable diaphragm sheets and the movable plate according to an embodiment. The diaphragm sheet transfer device shown in FIG. 2 mainly includes the movable plate 1 and two movable diaphragm sheets 3a, 3b. The movable plate 1 of the second embodiment is substantially the same as the movable plate 1 of the first embodiment, and will not be repeatedly described herein.

The two movable diaphragm sheets 3a, 3b can be joined with the movable plate 1, and the two movable diaphragm sheets 3a, 3b generally correspond to the movable plate 1 as a whole, for example, the movable diaphragm sheets 3a, 3b and the movable plate 1 are arranged in a layered stack structure. The movable diaphragm sheets 3a, 3b may be substantially in contact with the movable plate 1 or the two movable diaphragm sheets 3a, 3b may be substantially in contact with each other, or may be disposed with a sheet member (not shown in FIG. 1) having a reduced friction coefficient therebetween.

Each of the two movable diaphragm sheets 3a, 3b has a hollow portion 31. The hollow portion 31 in the second embodiment is composed of a large light through hole 33 and a small light through hole 35 having different opening areas and a part of the large and small light through holes 33 and 35 overlap each other. The large light through hole 33 and the small light through hole 35 are exemplified by a circular shape. Therefore, as viewed from the outer appearance, the hollow portion 31 includes two circular holes which are partially staggered with each other. The two circular holes seem to be incomplete, but in different positions, the hollow portions 31 of the two movable diaphragm sheets 3a, 3b together form a complete two circular holes.

Figure 3A:
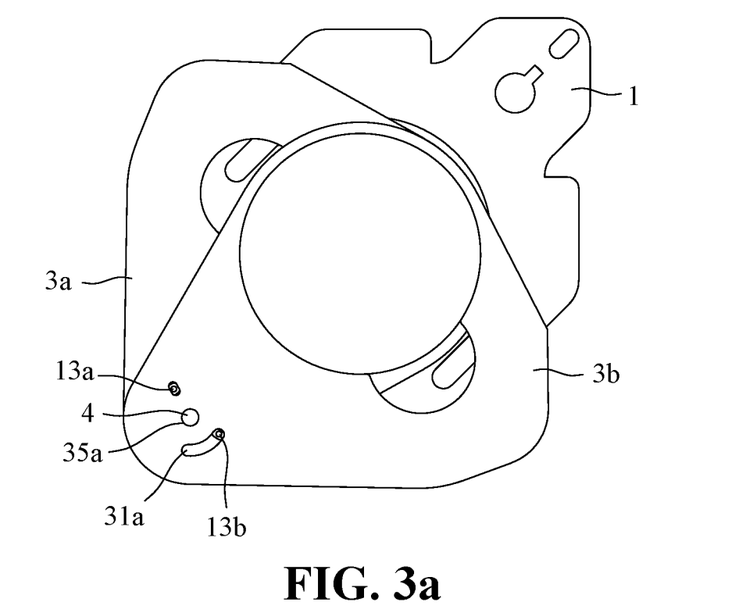
FIG. 3a is a schematic view of two movable diaphragm sheets at an initial position according to an embodiment.
Figure 3B:
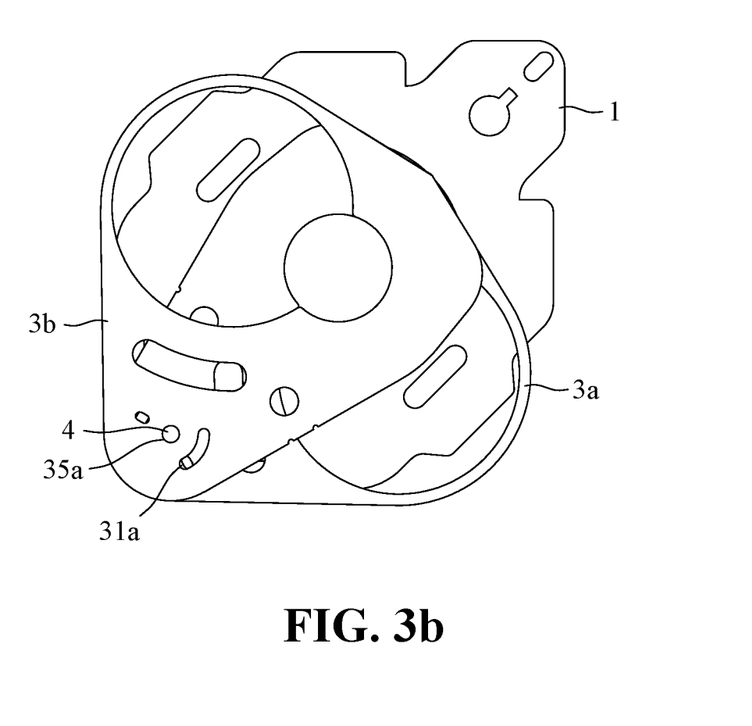
FIG. 3b is a schematic view of two movable diaphragm sheets at a transfer position according to an embodiment.

Specifically, when the movable plate 1 is at the initial position, the two hollow portions of the two movable diaphragm sheets 3a, 3b overlap to the extent that a large (small) light through hole is formed, and at this time, the large (small) light through hole is a complete circular shape, as shown in FIG. 3a. When the movable plate 1 is transferred to the transfer position, the two hollow portions 31 of the two movable diaphragm sheets 3a, 3b overlap to the extent that a small (large) light through hole is formed, and at this time, the small (large) light through hole is a complete circular shape, as shown in FIG. 3b.

The shape of the large light through hole 33 and the small light through hole 35 of the hollow portion 31 is not limited to a substantially circular shape, and may be an elliptical or approximately circular polygon.

An opening area (diameter) of the first opening 11 of the movable plate 1 needs to be significantly larger than an opening area (diameter) of the small light through hole 35. As to whether the first opening 11 is slightly larger or slightly smaller than the opening area of the large light through hole 33, it depends on actual needs. That is, if the diameter of the large light through hole 33 is slightly smaller than the diameter of the first opening 11 of the movable plate 1, the light flux is determined by the large light through hole 33; if the diameter of the large light through hole 33 is slightly larger than the diameter of the first opening 11 of the movable plate 1, the first opening 11 of the movable plate 1 replaces the large light through hole to determine the light flux.

As shown in FIG. 3a, when the movable plate 1 is at the initial position, the hollow portions of the two movable diaphragm sheets 3a, 3b together form the large light through hole of a complete circular shape. When the movable plate 1 is transferred from the initial position to the transfer position, the two movable diaphragm sheets 3a, 3b can be rotated toward each other by an angle to gradually enlarge the overlapping portions of the two movable diaphragm sheets 3a, 3b. When finally reaching the transfer position, as shown in FIG. 3b, the hollow portions of the two movable diaphragm sheets 3a, 3b together form the small light through hole of a complete circular shape. When the movable plate 1 is returned from the transfer position to the initial position, the two movable diaphragm sheets 3a, 3b can be rotated each other in the opposite direction by an angle to gradually reduce the overlapping portions of the two movable diaphragm sheets 3a, 3b. When finally returning to the initial position, the hollow portions of the two movable diaphragm sheets 3a, 3b together form the large light through hole of the complete circular shape.

In an embodiment, the movable plate 1 is formed as the small light through hole at the initial position, and is formed as the large light through hole at the transfer position, so that the light flux is significantly changed.

In some embodiments, the movable plate 1 and the movable diaphragm sheets 3a, 3b are in the form of a thin plate.

Figure 4:
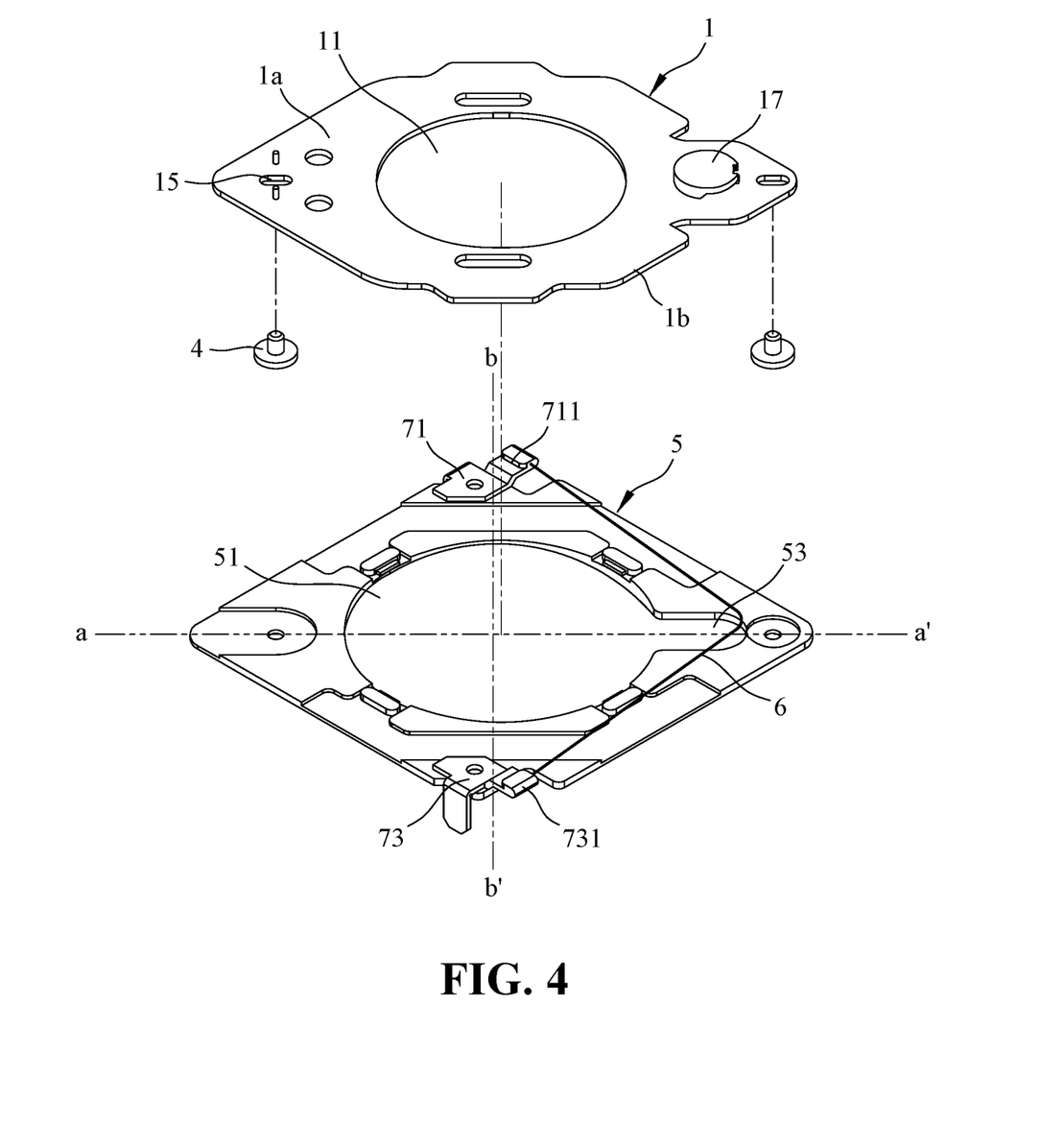
FIG. 4 is an exploded view of a base and a SMA wire according to an embodiment.

Referring to FIG. 4, FIG. 4 shows a connection relationship of the movable diaphragm sheets and the movable plate according to an embodiment, which can be configured with a shaft 4 and two rods as shown in FIG. 2. The two movable diaphragm sheets 3a, 3b are pivotally coupled to the shaft 4, and the shaft 4 is fixed at a fixed point and cannot move freely, for example, the shaft 4 is fixed to an external member (not shown in FIG. 4).

For convenience of explanation, a surface of the movable plate 1 facing the movable diaphragm sheet 3b is referred to as a first surface 1a, and another surface of the movable plate 1 facing a base 5 is referred to as a second surface 1b.

The two rods are vertically protruded from the first surface 1a of the movable plate 1 (in the axial direction), and the two movable diaphragm sheets 3a, 3b respectively define a through hole through which the two rods can pass so that the movable plate 1 and the two movable diaphragm sheets 3a, 3b can be connected through the rods and the through hole. Therefore, when the movable plate 1 moves toward the radial direction, the two movable diaphragm sheets 3a, 3b are driven and each of which rotates in a predetermined direction. In order not to interfere with the rotation of the two movable diaphragm sheets 3a, 3b, the two movable diaphragm sheets 3a, 3b are also respectively provided with the slot holes; thereby, the two movable diaphragm sheets 3a, 3b can be joined with the movable plate 1 to rotate with respect to the movable plate 1.

For more clarity, as shown in FIG. 2, the two movable diaphragm sheets will be divided into the first movable diaphragm sheet 3a and the second movable diaphragm sheet 3b, and the two rods of the movable plate 1 are referred to as a first rod member 13a and a second rod member 13b. The through hole and the slot hole formed in the first movable diaphragm sheet 3a are called as a first through hole 31a, and a first slot hole 33a, respectively. The through hole and the slot hole formed in the second movable diaphragm sheet 3b are called as a second through hole 31b, and a second slot hole 33b, respectively.

Therefore, the first movable diaphragm sheet 3a is provided with the first through hole 31a, the first slot hole 33a and a first pivot hole 35a pivotally coupled to the shaft 4. The second movable diaphragm sheet 3a is provided with the second through hole 31b, the second slot hole 33b and a second pivot hole 35b pivotally coupled to the shaft 4.

The first rod 13a passes through the first slot hole 33a and the second through hole 31b, and the second rod 13b passes through the first through hole 31a and the second slot 33b. Here, "the first rod member 13a and the second through hole 31b" and "the second rod member 13b and the first through hole 31a" must be formed substantially or just joined in an assembled set, such as just matching with each other, so that when the movable plate 1 moves, the two movable diaphragm sheets 3a, 3b can be simultaneously moved, and the movable diaphragm sheets 3a, 3b rotate with respect to the shaft 4 as a common axis.

The purpose of the first slot 33a and the second slot 33b are disposed so as not to interfere with the rotation of the movable diaphragm sheets 3a, 3b. Therefore, the opening shape or the area of the first slot hole 33a and the second slot hole 33b are not limited to the first slot hole and the second slot hole with a radian according to the matching rotation trajectory of FIG. 4. As long as the two movable diaphragm sheets 3a, 3b are not interfered to rotate, the shape and the configuration of the opening of the first slot hole 33a and the second slot hole 33b can be changed as needed. In some embodiments, the shaft 4 is preferably disposed between the first through hole 31a and the first slot 33a. If the shaft 4 is disposed between the first through hole 31a and the second through hole 31b, when the movable plate 1 moves from the initial position to the transfer position, the first movable diaphragm sheet 3a and the second movable diaphragm sheet 3b rotate in a counterclockwise direction and a clockwise direction, respectively, so that an incomplete small light through holes of the hollow portions of the two movable diaphragm sheets 3a, 3b are integrated into a complete small light through hole, and the light flux is determined by the small light through hole.

When the movable plate 1 moves from the transfer position to the initial position, the first movable diaphragm sheet 3a and the second movable diaphragm sheet 3b rotate in a clockwise direction and a counterclockwise direction, respectively, so that an incomplete large light through holes of the hollow portions of the two movable diaphragm sheets 3a, 3b are integrated into a complete large light through hole, and the light flux is determined by the large light through hole.

In some embodiments, the hollow portions 31 are disposed on an upper half of the two movable diaphragm sheets 3a, 3b, and the first through hole 31a, the second through hole 31b, the first slot hole 33a and the second slot hole 33b are located on a lower half of the two movable diaphragm sheets 3a, 3b. However, the actual configuration of the above members can be changed according to actual needs.

Preferably, the structure of the first movable diaphragm sheet 3a and the second movable diaphragm sheet 3b is symmetrical.

Referring to FIG. 4, FIG. 4 is an exploded view of a base and a shape memory alloy (SMA) wire according to an embodiment. As shown in FIG. 4, in addition to the movable plate 1 and the two movable diaphragm sheets 3a, 3b, the movable plate 1 further includes a base 5 and a SMA wire 6. The movable plate 1 is disposed on the base 5, and the movable plate 1 can perform a linear motion or a linear reciprocating motion on the base 5.

The base 5 is substantially quadrangular, and a second opening 51 through which the incident light passes is disposed at a center of the base 5. The second opening 51 corresponds to the first opening 11 and communicates with it. The second opening 51 corresponds to the hollow portion 31 and communicates with it, which the incident light passes through. The opening area of the second opening 51 and the first opening 11 is significantly larger than the small light through hole 35 of the hollow portion 31.

Preferably, the movable plate 1 is further provided with an oriented long shaft hole 15 corresponding to the shaft 4, and a longitudinal direction of the oriented long shaft hole 15 is the same as the radial direction, so that the movable plate 1 can not only move along the radial direction but also moves in the linear motion on the fixed trajectory, and the movable plate 1 move linearly along the diagonal line.

In some embodiments, the shaft 4 can be an independent T-shaped and is fixed on the base 5. In some embodiments, the shaft 4 can also be directly integrated with the base 5.

A wire rod 17 is disposed on the first surface 1a, and the arrangement positions of the wire rod 17 and the oriented long shaft hole 15 substantially correspond to two opposite angles of the base 5 (on the diagonal line a-a'). The two opposite angles (the diagonal line b-b') are provided with a first fixing member 71 and a second fixing member 73.

The first fixing member 71 and the second fixing member 73 may be formed into a predetermined shape by using a metal plate. The first fixing member 71 and the second fixing member 73 are respectively formed with the hook-shaped joint portions 711, 731. The SMA wire 6 is pre-formed into a V shape, the two ends of the V-shaped SMA wire 6 are respectively joined with the joint portion 711 of the first fixing member 71 and the joint portion 731 of the second fixing member 73, and a bent portion between the two ends of the SMA wire 6 detours around and abuts against the wire rod 17.

The SMA wire 6 is further electrically connected to an electric device (not shown) so that the SMA wire 6 is thermally deformed to contract after being supplied with the electricity. It should be noted that the V-shape mentioned in the above SMA wire 6 is only for convenience of explaining the fourth embodiment, and therefore is not limited to the V shape, and the V-shaped SMA wire 6 includes a linear body having a sharp bent shape.

The two ends of the SMA wire 6 are connected to the first fixing member 71 and the second fixing member 73 by crimping or welding.

The SMA wire 6 is wound around a side of the wire rod 17 away from the first opening 11 so that when the SMA wire 6 is contracted, the wire rod 17 is pushed by the SMA wire 6 to drive the movable plate 1 for moving toward the direction of the first opening 11.

An outer peripheral surface of the wire rod 17 has a gap structure with a step shape, for example, the diameter of the head of the wire rod 17 is larger than the diameter of the body portion or an intermediate portion of the outer peripheral surface of the wire rod 17 forms a groove (not shown). The position of the SMA wire 6 is maintained through the gap structure such as the step shape and the groove. The wire rod 17 can be formed as an independently formed member, and can also be integrally formed with the movable plate 1. For example, the wire rod 17 is an independently formed member, and the wire rod 17 may be a T-shaped member and assembled on the movable plate 1.

The base 5 can be further provided with an auxiliary directional long hole 53, and a bottom end of the wire rod 17 can extend from the second surface 1b of the movable plate 1 and protrude into the auxiliary directional long hole 53 so that the bottom end of the wire rod 17 can be guided by the auxiliary orientation long hole 53 to move. Although the auxiliary directional long hole 53 in the drawing communicates with the second opening 51, it may not be connected, if necessary.

When the SMA wire 6 is contracted by heat, the length of the SMA wire 6 is shortened to drive the movable plate 1 to move toward the diagonal direction of the wire rod 17, and at the same time, due to the cooperation of the oriented long shaft hole 15 of the movable plate 1 and the shaft 4, the movable plate 1 moves in a linear motion, thereby driving the two movable diaphragm sheets to move.

Figure 5:
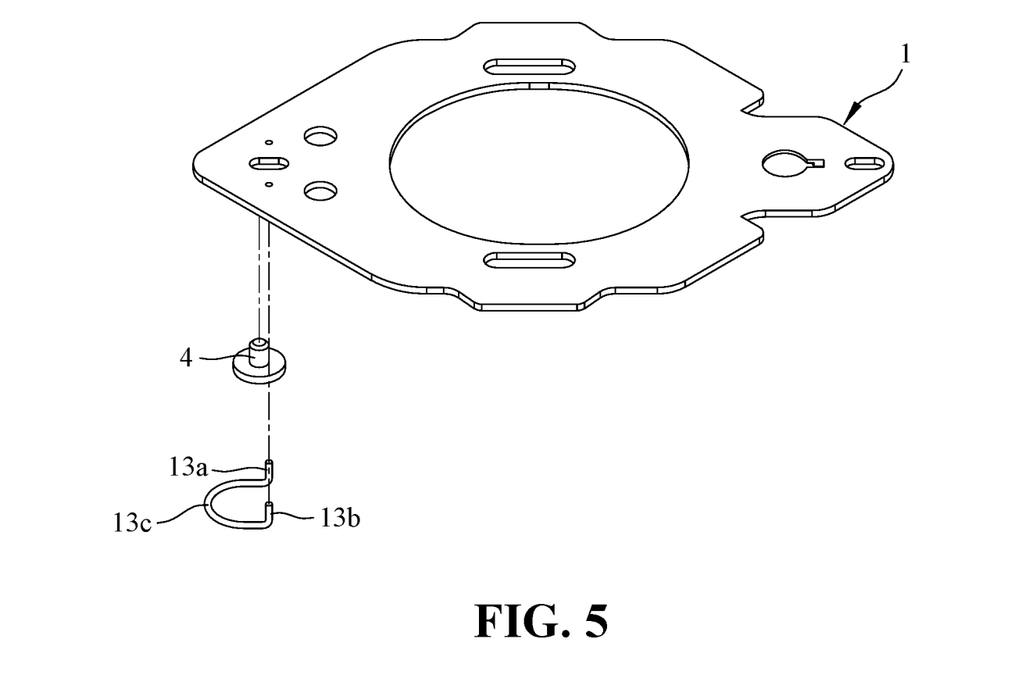
FIG. 5 is a schematic view of a single member including two rods and a connecting rod according to an embodiment.

Referring to FIG. 5, FIG. 5 is a schematic view of a single member including two rods and a connecting rod according to an embodiment. When the movable plate 1 is disposed on the base 5, the two rod members 13a, 13b which are originally integrally formed on the movable plate 1 can also be independently formed members. In some embodiments, the two rod members 13a, 13b can be connected by a connecting rod 13c, and the connecting rod 13c is fixed on the base 5. The specific cooperation relationship among the two rod members 13a, 13b, the movable plate 1 and the movable diaphragm sheets 3a, 3b are described above, and no longer repeatedly described herein.

In the above embodiment, the movable plate 1 is transferred from the initial position to the transfer position, and the switching operation between the large light through hole 33 and the small light through hole 33 is realized, that is, the amount of the incident light is significantly changed. The movable plate 1 that is driven to move by the SMA wire 6 is more specifically provided in the fourth embodiment. When the SMA wire 6 returns to the unheated contract state, the movable plate 1 may return to the initial position, but may not effectively return to the initial position.

Therefore, some representative embodiments are provided below for allowing the movable plate 1 to be effectively returned to the initial position. In conjunction with some of the foregoing embodiments, the movable plate 1 can be reciprocated between the initial position and the transfer position, thereby allowing the amount of the incident light to be changed back and forth.

Figure 6A:
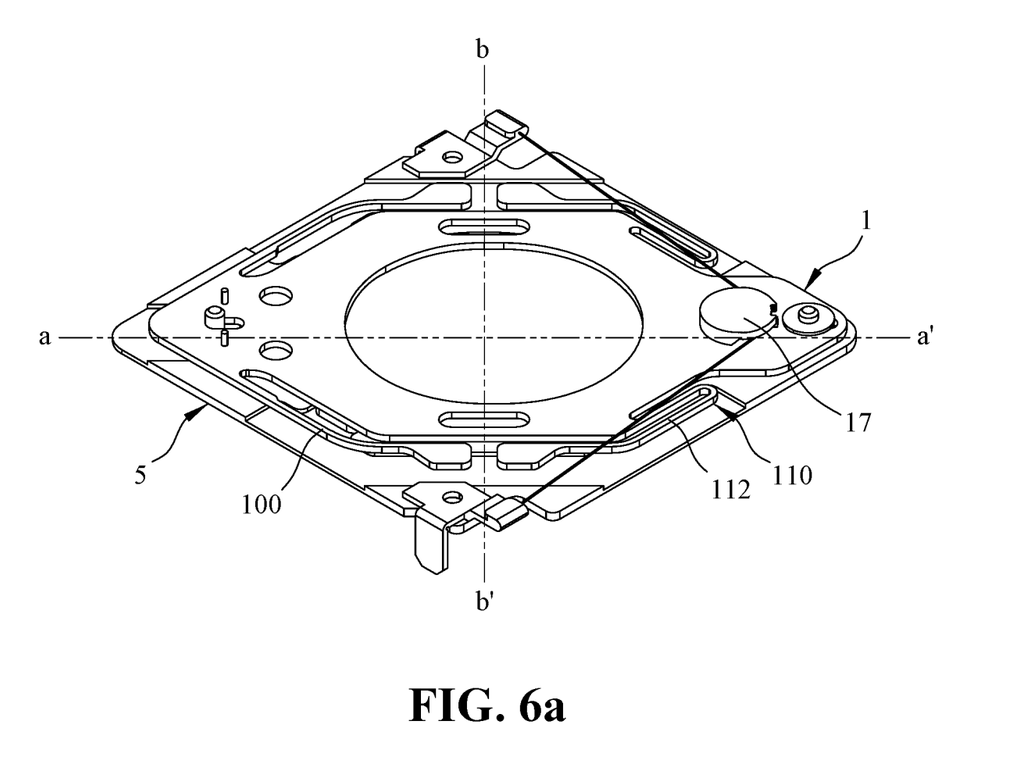
FIG. 6a is a schematic view of a recovery structure integrally formed with a movable plate according to an embodiment.

Referring to FIG. 6a, FIG. 6a is a schematic diagram of a recovery structure integrally formed with the movable plate according to an embodiment. As shown in FIG. 6a, the recovery structure is integrally formed with the movable plate 1. The recovery structure is two elastic extension arms 100, 110 and is formed on two opposite sides of the movable plate 1.

Figure 6B:
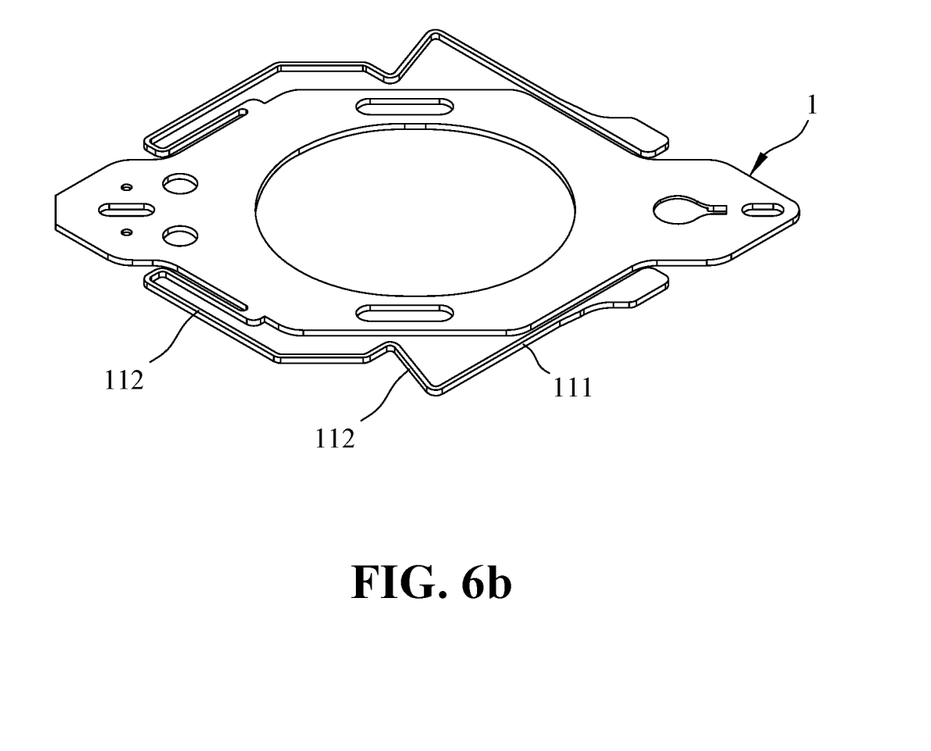
FIG. 6b is a schematic view of a single extension arm according to an embodiment.

Both ends of the two extension arms 100, 110 are a connection end and a free end, and the connection end is a portion extending from the movable plate 1 or a portion of the two extension arms 100, 110 joining with the movable plate 1. In some embodiments of the present invention, since the movable plate 1 moves along the diagonal line a-a', the diagonal line a-a' is an imaginary line defined by the two opposite angles, the joint ends of the two extension arms 100, 110 may be at two corners of the side edges of the movable plate 1 near the diagonal line a-a', and the two extension arms 100, 110 are integrally disposed along the sides of the movable plate 1 and are separated from a space. The free ends of the two extension arms 100, 110 are located near the corners on the diagonal line b-b' and are fixed on the base 5. The extension arm 111 shown in FIG. 6b can also provide a pull-back force.

Through the above-mentioned recovery structure, when the movable plate 1 is transferred from the initial position to the transfer position, the two extension arms 100, 110 are twisted and deformed while they also generate the pull-back force for the movable plate 1. Therefore, when the SMA wire 6 is cooled and returned to its uncontracted state, the pull-back force provided by the two extension arms 100, 110 can make the movable plate 1 return back to the initial position.

A U-shaped bent section 112 is further formed at the extension arm 110 near the side of the wire rod 17, and the bent section 112 can generate a large pull-back force so that the movable plate 1 can be effectively returned to the initial position.

Figure 7:
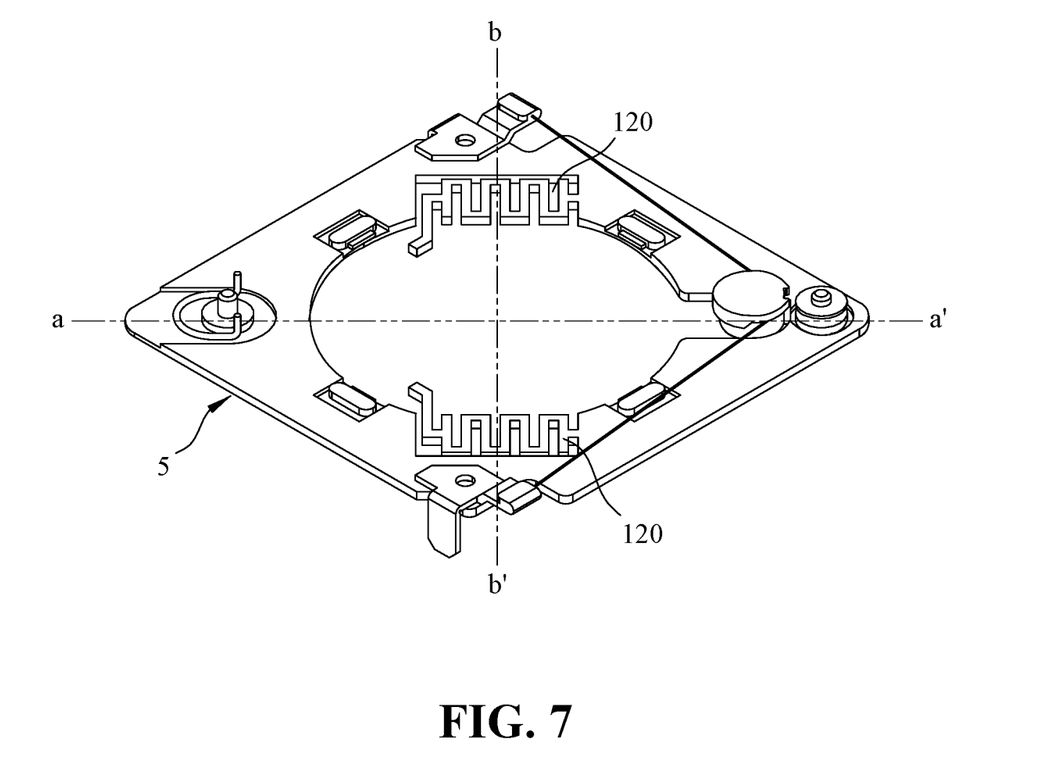
FIG. 7 is a schematic view of a recovery structure integrally formed with a base according to an embodiment.

Referring to FIG. 7, FIG. 7 is a schematic view of a recovery structure integrally formed with the base according to an embodiment. As shown in FIG. 7, in the second embodiment of the recovery structure, the recovery structure is integrally formed with the base 5, and the recovery structure is a S-shaped spring 120 formed on two opposite sides of the base 5 (parallel to the sides of the diagonal line a-a'). One end of the S-shaped spring 120 is coupled to the base 5, and another end of the S-shaped spring 120 is fixed on the movable plate 1.

Figure 8:
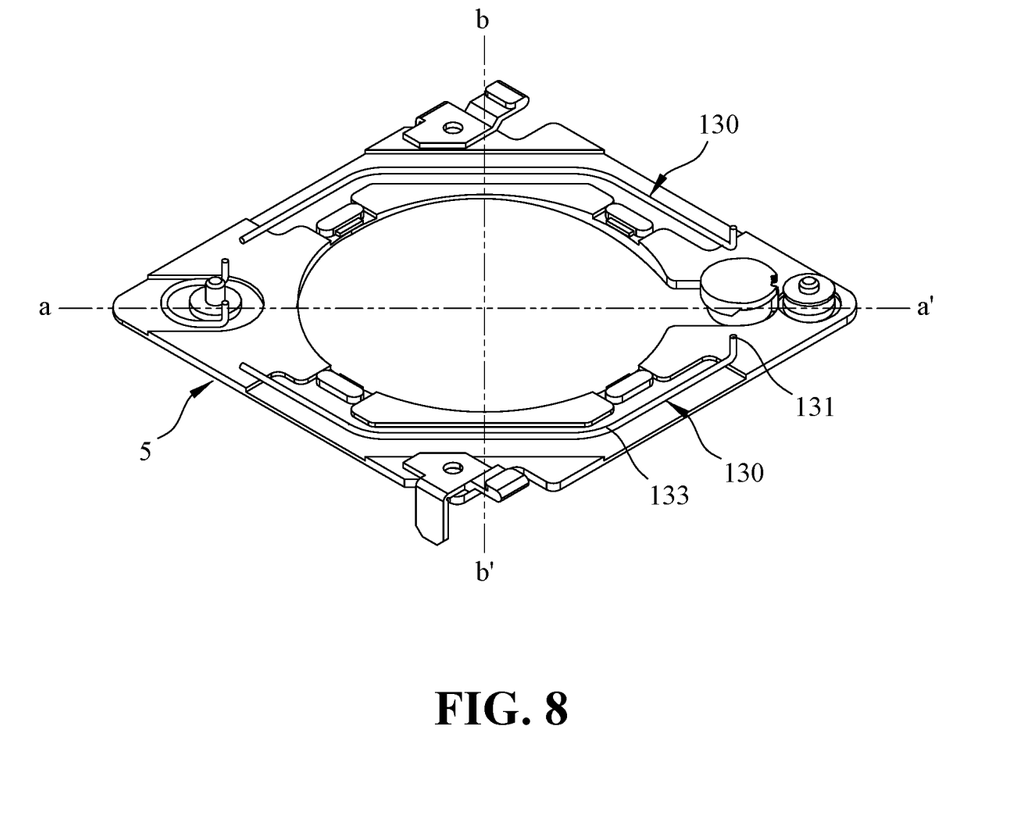
FIG. 8 is a schematic view of a recovery structure as an independent member according to an embodiment.

Referring to FIG. 8, FIG. 8 is a schematic view of the recovery structure as a separate member, according to an embodiment. As shown in FIG. 8, the recovery structure of the third embodiment is two separate elastic rods 130. The two elastic rods 130 are integrally disposed on the surface of the base 5 and located on two opposite sides of the movable plate 1 (parallel to the sides of the diagonal line a-a'). The two ends of the elastic rods 130 are respectively located near the shaft 4 and the wire rod 17, and the portion of the elastic rods 130 near the shaft 4 is fixed on the base 5, and the portion of the elastic rods 130 near the wire rod 17 is freely movable. One end of the elastic rod 130 near the wire rod 17 forms a hook portion 131 that can be hooked to the movable plate 1. The portion of the elastic rod 130 near the wire rod 17 has a bent section 133 that forms an approximate V shape. Therefore, when the movable plate 1 is transferred to the transfer position, the bent portion 133 of the elastic rods 130 provides the pull-back force due to the deformation. Therefore, when the SMA wire 6 is cooled and returned to its uncontracted state, the movable plate 1 is returned to the initial position due to the pull-back force provided by the bent section 133 of the elastic rods 130.

Figure 9:
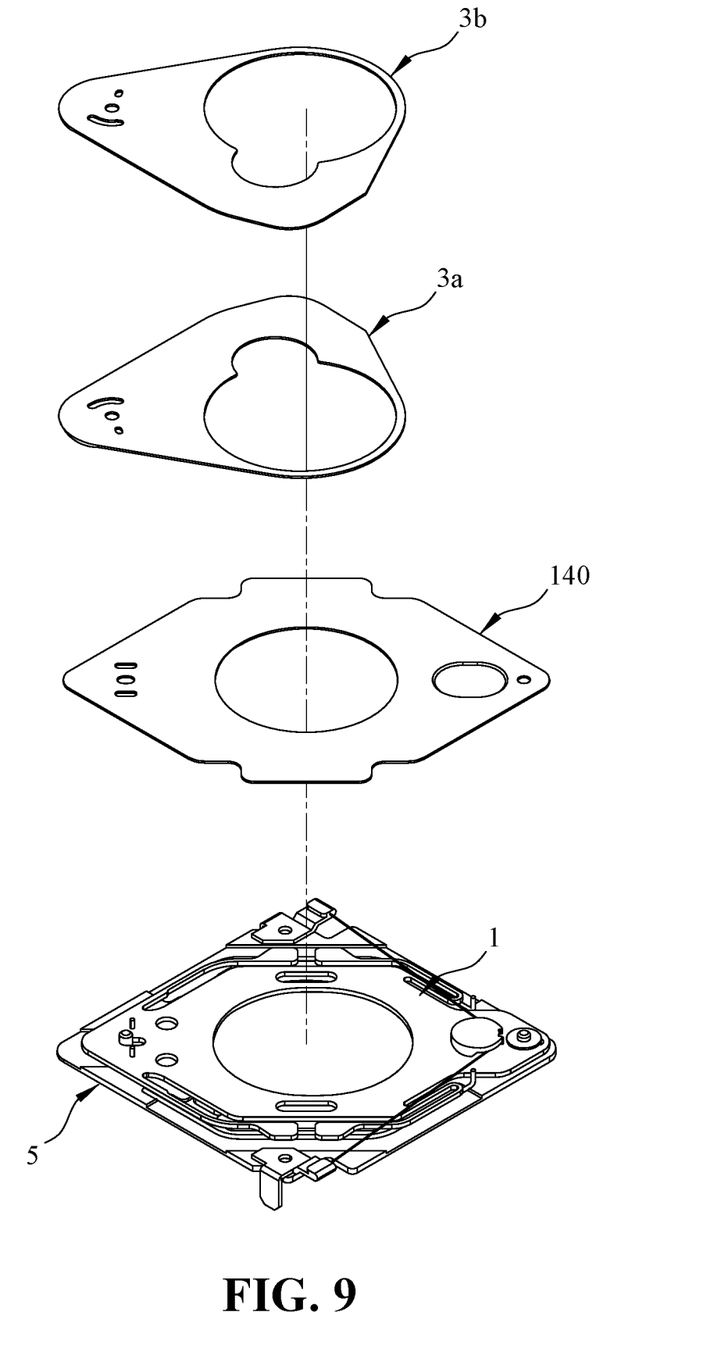
FIG. 9 is a schematic view of a spacer plate according to an embodiment.

Referring to FIG. 9, FIG. 9 is a schematic view of a spacer plate according to an embodiment, a spacer plate 140 can be further disposed in some embodiments. The spacer plate 140 is disposed between the movable plate 1 and the movable diaphragm sheet 3a. The installation of the spacer plate 140 is to reduce the friction of the movable plate 1 against the movable diaphragm sheet 3a to help the movement to be smoother. In some embodiments, the spacer plate 140 may also be disposed on the movable diaphragm sheets 3a, 3b.

Figure 10:
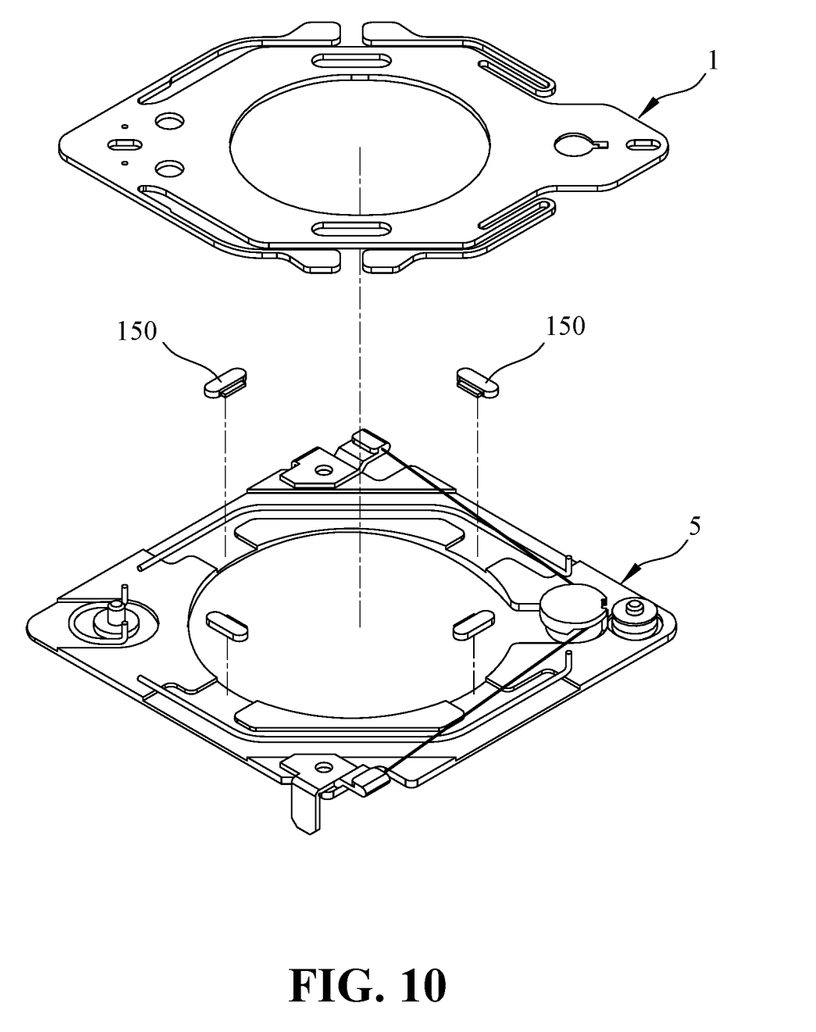
FIG. 10 is a schematic view of a spacer block according to an embodiment.

Referring to FIG. 10, FIG. 10 is a schematic view of a spacer block according to an embodiment, a plurality of spacer blocks 150 are disposed in some embodiments. The spacer blocks 150 are disposed between the movable plate 1 and the base 5. The installation of the spacer blocks 150 is to reduce the friction of the movable plate 1 against the base 5 to help the movement to be smoother.

In some embodiments, the two movable diaphragm sheets have the same structure, and their installation is symmetric with each other, so that the rotation amplitude of the diaphragm sheets can be shortened; that is, the large hole and the small light through hole are switched by the minimum rotation amplitude. In this way, the number of members can be more sample, and the overall volume can be made miniature and thin.

The above are only used to explain the preferred embodiments of the present invention, and are not intended to limit the present invention in any form. Therefore, any modification or change related to the present invention made in the same spirit of the invention should still be included in the scope of the present invention.

What is claimed is:

1. A diaphragm sheet transfer device for a handheld electronic device to change an amount of a light incident to a lens device, comprising:
at least two movable diaphragm sheets disposed on an incident light path of the incident light, and the at least two movable two diaphragm sheets respectively having a hollow portion through which the incident light passes, and the at least two movable diaphragm sheets being driven to transfer from an initial position to a transfer position, wherein when the at least two movable diaphragm sheets are driven, each of which rotates by a certain amplitude toward a predetermined direction to change a corresponding extent of the hollow portions between the at least two movable diaphragm sheets,
a movable plate being radially movable from one position to another position to drive the two movable diaphragm sheets to transfer from the initial position to the transfer position, the movable plate being disposed on the incident light path of the incident light and having a first opening for allowing the incident light to pass through,
a base and a V-shaped shape memory alloy (SMA) wire movably disposed on the base to provide a pull force for pulling the movable plate to move on the base, the base having a second opening for allowing the incident light to pass through, and
a recovery structure disposed between the movable plate and the base to resist the pull force of the SMA wire on the movable plate, the recovery structure including two independent recovery members located symmetrically on two opposite sides of the movable plate.

2. The diaphragm sheet transfer device according to claim 1, wherein the hollow portions of the two movable diaphragm sheets are a symmetrical structure.

3. The diaphragm sheet transfer device according to claim 1, further comprising a shaft, and the two movable diaphragm sheets are pivotally coupled to the shaft.

4. The diaphragm sheet transfer device according to claim 1, further comprising two fixing members that are fixed on two corners of the base, and two ends of the SMA wire are fixed on the two fixing members.

5. The diaphragm sheet transfer device according to claim 1, wherein each recovery member is an elastic extension arm integrally formed with the movable plate with one end connected to the movable plate and another end fixed on the base.

6. The diaphragm sheet transfer device according to claim 5, wherein the elastic extension arm includes a U-shaped bent section.

7. The diaphragm sheet transfer device according to claim 1, wherein each recovery member is an S-shaped spring integrally formed on the base with one end coupled to the base and another end fixed on the movable plate.

8. The diaphragm sheet transfer device according to claim 1, wherein each recovery member is an elastic rod with one end fixed on the base and another end formed with a hook portion and a bent section, the elastic rod being a separate rod not integrally formed with the base or the movable plate.

9. The diaphragm sheet transfer device according to claim 1, wherein the hollow portion includes two light through holes with different opening areas, the two light through holes are partially intersected, the hollow portions of the two movable diaphragm sheets at the initial position are complementary as an first shape of a light through hole, and the hollow portions of the two movable diaphragm sheets at the transfer position are complementary as a second shape of another light through hole.

\* \* \* \* \*